United States Patent
Lv et al.

(10) Patent No.: US 10,393,423 B2
(45) Date of Patent: Aug. 27, 2019

(54) HEAT INSULATION DOOR AND REFRIGERATION APPLIANCE WITH THE HEAT INSULATION DOOR

(71) Applicant: BSH HAUSGERAETE GMBH, Munich (DE)

(72) Inventors: Ping Lv, Nanjing (CN); Yaoguo Xu, Nanjing (CN); Chuan Zhang, Chuzhou (CN)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 15/835,553

(22) Filed: Dec. 8, 2017

(65) Prior Publication Data
US 2018/0164024 A1    Jun. 14, 2018

(30) Foreign Application Priority Data
Dec. 12, 2016    (CN) .......................... 2016 1 1142493

(51) Int. Cl.
*A47F 3/04*    (2006.01)
*F25D 23/02*   (2006.01)

(52) U.S. Cl.
CPC ............ *F25D 23/02* (2013.01); *A47F 3/0434* (2013.01); *F25D 2201/14* (2013.01); *F25D 2323/023* (2013.01); *F25D 2400/18* (2013.01)

(58) Field of Classification Search
CPC . F25D 23/02; F25D 23/028; B32B 17/10036; B32B 17/10045; B32B 17/10055; B32B 17/10064; B32B 17/10073; A47F 3/0434; A47F 3/043
See application file for complete search history.

(56) References Cited

U.S. PATENT DOCUMENTS

| | | | | |
|---|---|---|---|---|
| 4,459,789 A | * | 7/1984 | Ford | .......................... E06B 3/24 52/171.3 |
| 5,214,877 A | * | 6/1993 | Kaspar | .................... A47F 3/043 312/296 |
| 5,910,083 A | * | 6/1999 | Richardson | ......... E06B 3/66366 312/116 |
| 2002/0056184 A1 | * | 5/2002 | Richardson | ........... A47F 3/0434 29/458 |
| 2003/0066256 A1 | * | 4/2003 | DeBlock | ................. B32B 17/10 52/208 |
| 2006/0188730 A1 | | 8/2006 | Varanasi et al. | |
| 2006/0273700 A1 | * | 12/2006 | Gornoll | ................. A47F 3/0434 312/116 |

(Continued)

FOREIGN PATENT DOCUMENTS

DE    202008005366 U1    7/2008
EP         2110238 A1    10/2009

*Primary Examiner* — Daniel J Rohrhoff
(74) *Attorney, Agent, or Firm* — Laurence A. Greenberg; Werner H. Stemer; Ralph E. Locher

(57) ABSTRACT

A refrigeration appliance and a heat insulation door thereof are provided. The heat insulation door includes a heat insulation vacuum glass module formed with a first glass plate and the second glass plate that are overlapped and that have a first interval; a third glass plate overlapped on the vacuum glass module and having a second interval with the vacuum glass module; and the second interval is filled with inert gas. The novel door improves the heat insulation of the refrigeration appliance.

15 Claims, 3 Drawing Sheets

(56) References Cited

U.S. PATENT DOCUMENTS

| | | | |
|---|---|---|---|
| 2007/0062226 A1* | 3/2007 | Gomoll | A47F 3/0434 68/34 |
| 2008/0190046 A1* | 8/2008 | Hecht | A47F 3/0434 52/173.1 |
| 2009/0045712 A1* | 2/2009 | Laible | A47B 96/20 312/401 |
| 2012/0090246 A1* | 4/2012 | Nunez-Regueiro | A47F 3/0434 49/484.1 |
| 2014/0154434 A1* | 6/2014 | Nunez-Regueiro | C03C 3/087 428/34 |
| 2016/0045038 A1* | 2/2016 | Chubb | A47F 3/0434 312/116 |
| 2016/0047592 A1* | 2/2016 | Rolek | A47F 3/0426 312/406.1 |
| 2018/0164025 A1* | 6/2018 | Lv | F25D 23/02 |

\* cited by examiner

HEAT INSULATION DOOR AND REFRIGERATION APPLIANCE WITH THE HEAT INSULATION DOOR

CROSS-REFERENCE TO RELATED APPLICATION

This application claims the benefit, under 35 U.S.C. § 119, of Chinese patent application CN 201611142493.8, filed Dec. 12, 2016; the prior application is herewith incorporated by reference in its entirety

BACKGROUND

Technical Field

The present invention relates to the field of refrigeration, in particular to a refrigeration appliance and a heat insulation door thereof.

Related Art

A door of a traditional refrigerator is generally formed by foaming, and a user cannot see the interior of a refrigeration appliance from outside. The refrigeration appliance adopting a glass door provides the possibility for the user to observe the interior of a refrigeration space without opening the door. However, if the heat insulation effect of the refrigeration appliance door with the heat insulation glass module is not ideal, condensations are likely to occur on the door.

BRIEF SUMMARY OF THE INVENTION

An objective of the present invention is to provide an improved heat insulation door in order to solve at least one of the technical problems described above.

In order to solve the above problems, the present invention provides a heat insulation door for a refrigeration appliance, comprising: a heat insulation vacuum glass module, wherein the vacuum glass module comprises a first glass plate and a second glass plate that are overlapped and that have a first interval; a third glass plate overlapped on the vacuum glass module and having a second interval with the vacuum glass module; and the second interval is filled with inert gas.

Compared with the prior art, the technical solution of the present invention has the following advantages: the heat insulation door comprises the vacuum glass module and the third glass plate that are overlapped, and an inert gas layer is arranged between the third glass plate and the vacuum glass module, so that the heat insulation door has good heat insulation effect, thereby preventing the condensation on a surface of the door.

Optionally, a first sealing portion is disposed between an edge of the first glass plate and an edge of the second glass plate to enable the first interval to form an enclosed space.

Optionally, a second sealing portion is disposed between an edge of the third glass plate and an edge of the vacuum glass module to enable the second interval to form an enclosed space.

Optionally, the heat insulation door further comprises a fourth glass plate that is overlapped on a side of the vacuum glass module away from the third glass plate and that has a third interval with the vacuum glass module, wherein the third interval is filled with inert gas. The inert gas in the third interval can further improve the heat insulation effect of the heat insulation door.

Optionally, a third sealing portion is disposed between an edge of the fourth glass plate and an edge of the vacuum glass module to enable the second interval to form as an enclosed space.

Optionally, along the front-to-rear direction of the door, one of the third glass plate and the fourth glass plate is located in front of the vacuum glass module as a front decoration plate, the other one is located at the back of the vacuum glass module as a rear protective layer; and in a width and/or length direction of the first glass plate, the front decoration plate is provided with a protruding portion that extends out of the edge of the vacuum glass module. The protruding portion can be used for shielding other parts, for example, can be used for partially or completely shielding the doorframe.

Optionally, in a width and/or length direction of the first glass plate, the protruding portion of the front decoration plate extends out of the rear protective layer.

Optionally, the heat insulation door further comprises a doorframe surrounding the vacuum glass module, wherein the doorframe comprises: a first cooperative wall located on a rear side of the protruding portion and connected to the protruding portion; a second cooperative wall located behind the first cooperative wall along the front-to-rear direction; a connecting wall connecting the first cooperative wall and the second cooperative wall; and along the front-to-rear direction, the vacuum glass module is located between the first cooperative wall and the second cooperative wall.

Optionally, a rear surface of the rear protective layer and the second cooperative wall are face-to-face and connected to each other.

Optionally, a sealing portion is arranged between edges of two adjacent layer structures having an interval in a multi-layer structure formed by the front decoration plate, the first glass plate, the second glass plate and the rear protective layer, and projections of various sealing portions are overlapped along the front-to-rear direction of the door.

Optionally, the second cooperative wall covers the sealing portion.

Optionally, the front decoration plate is a colorful crystal glass plate.

Optionally, the rear protective layer is a toughened glass plate, a vacuum glass plate, or a plastic plate.

Another objective of the present invention is to provide an improved refrigeration appliance, and the refrigeration appliance comprises the above heat insulation door.

Other features which are considered as characteristic for the invention are set forth in the appended claims.

Although the invention is illustrated and described herein as embodied in a refrigeration appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION

The foregoing objectives, features and advantages of the present invention will become more apparent from the following detailed description of specific embodiments of the invention in conjunction with the accompanying drawings.

Figure 1:
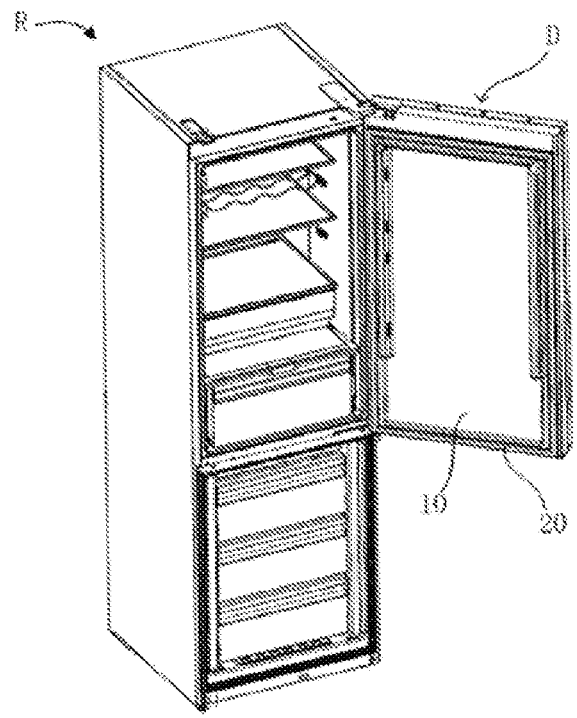
FIG. 1 is a three-dimensional structural schematic diagram of a refrigeration appliance of embodiments of the present invention.

Referring to FIG. 1, the present embodiment provides a refrigeration appliance R and a heat insulation door D for the refrigeration appliance R. The refrigeration appliance R may be a refrigerator or other electric appliances with a refrigeration space.

Figure 2:
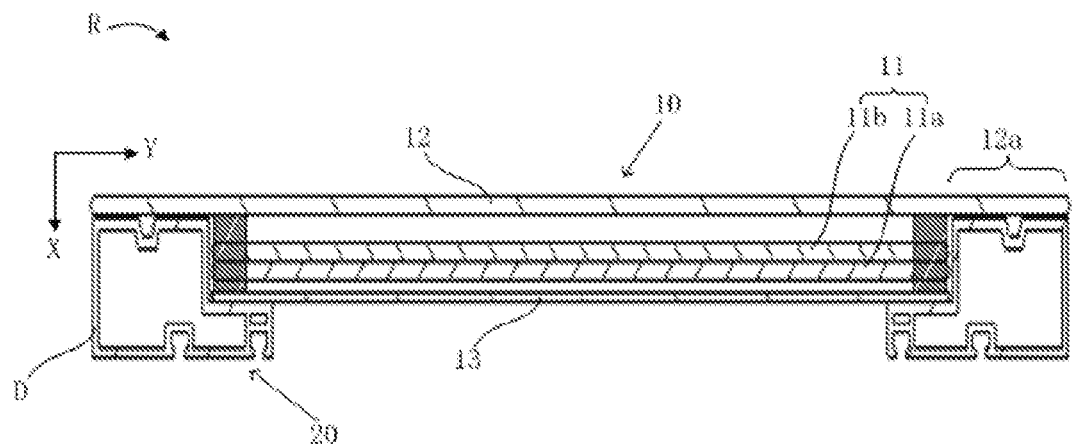
FIG. 2 is a cross-section schematic diagram of a heat insulation door of embodiments of the present invention.
Figure 3:
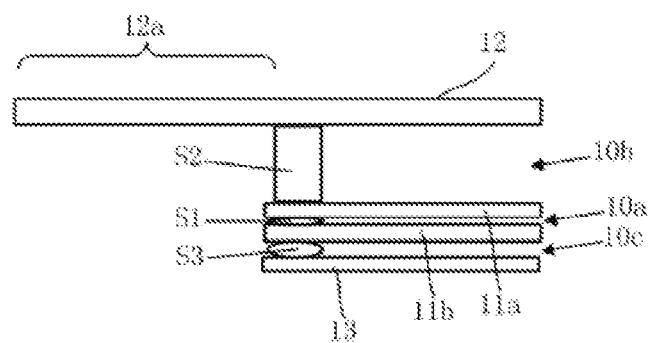
FIG. 3 illustrates a layer structural schematic diagram of a door body of the heat insulation door of embodiments of the present invention.
Figure 4:
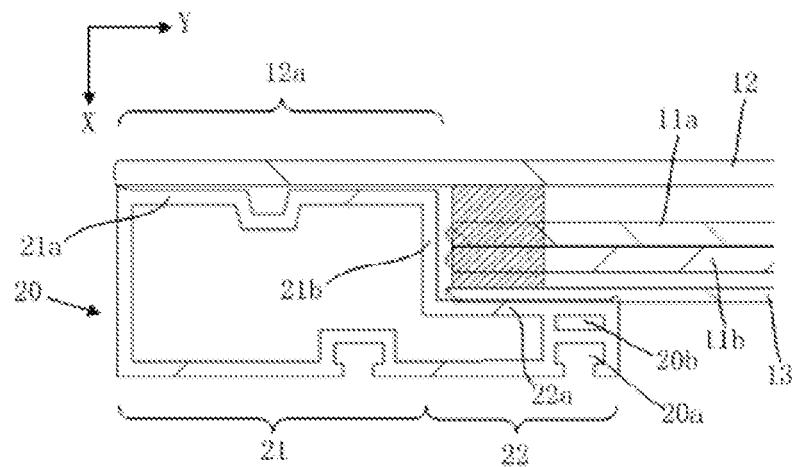
FIG. 4 is a local cross-section schematic diagram of the heat insulation door of embodiments of the present invention.

As shown in FIG. 2, FIG. 3 and FIG. 4, the heat insulation door D comprises a door body 10 of a multilayer structure and a doorframe 20. The door body 10 comprises a heat insulation vacuum glass module 11, wherein the vacuum glass module 11 comprises a first glass plate 11a and a second glass plate 11b that are overlapped and that have a first interval 10a (i.e., a spacing distance 10a, or space), and the first glass plate 11a is located in front of the second glass plate 11b along the front-to-rear direction X of the door. In addition, the door body 10 further comprises a third glass plate 12 overlapped in front of the vacuum glass module 11 and used for shielding the first glass plate 11a, a second interval 10b (i.e., a spacing distance, or space) is provided between the third glass plate 12 and the vacuum glass module 11, and the second interval 10b is filled with inert gas.

The present solution has the following advantages: the heat insulation door comprises the vacuum glass module and the third glass plate that are overlapped, and an inert gas layer is disposed between the third glass plate and the vacuum glass module, thus improving the heat insulation effect of the heat insulation door, and avoiding condensations on the surface of the door.

In some other embodiments, the third glass plate 12 can be disposed at the back of the vacuum glass module 11 to shield the second glass plate 11b.

It shall be noted that in the present application, without otherwise specified, the "front-to-rear direction" refers to the front-to-rear direction of the door, i.e. a thickness direction of the door. The "front" is a direction pointing to a front surface of the door, and the "back" is a direction pointing to a back surface of the door. The "inner side" refers to one side, close to the center of the door body, of a plane in which the door body is located, i.e. one side away from the edge of the door.

In the present embodiment, the third glass plate 12 is located in front of the vacuum glass module 11, on one hand, the third glass plate can play a decoration role to improve the appearance attractiveness of the heat insulation door; and on the other hand, the third glass plate can also be used for protecting the glass module 11 to prevent the glass module from being directly exposed to a range that a user can reach, thereby preventing the breaking probability of the glass module, and also preventing the glass module when being broken from injuring a user. The third glass plate 12 may be a toughened glass plate, a colorful crystal glass plate or a plastic plate, and is preferably the colorful crystal glass plate.

As shown in FIG. 3, a first sealing portion S1 is disposed between an edge of the first glass plate 11a and an edge of the second glass plate 11b in the vacuum glass module 11 to enable the first interval 10a to form an enclosed space. Generally speaking, the first sealing portion S1 is in an annular shape surrounding the edge of the vacuum glass module 11.

Meanwhile, a second interval 10b is provided between the third glass plate 12 and the vacuum glass module 11. A second sealing portion S2 is disposed between an edge of the third glass plate 12 and an edge of the vacuum glass module 11 to enable the second interval 10b to form an enclosed space. The first sealing portion S2 is also basically in an annular shape surrounding the vacuum glass module 11. In comparison to the first interval 10a between the first glass plate 11a and the second glass plate 11b in the vacuum glass module 11, the second interval 10b between the third glass plate 12 and the vacuum glass module 11 can be slightly bigger so as to form a hollow space.

Generally speaking, the second sealing portion S2 is also in an annular shape surrounding the edge of the vacuum glass module 11. It can be seen from FIG. 3 that along the front-to-rear direction of the door, projections of the second sealing portion S2 and the first sealing portion S1 on a same edge are at least partially overlapped.

As shown in FIG. 2 to FIG. 4, the door body 10 further comprises a fourth glass plate 13 that is overlapped on one side, away from the third glass plate 12, of the vacuum glass module 11. In the present embodiment, the fourth glass plate 13 is located at the back of the second glass plate 11b along the front-to-rear direction X so as to shield the second glass plate 11b. The fourth glass plate 13 is used for protecting the heat insulation glass module 11 at the back and can be used as a decorative layer on the inner side of the heat insulation door D. The fourth glass plate 13 may be a toughened glass plate, a colorful crystal glass plate or a plastic plate.

The fourth glass plate 13 may be disposed with an interval from the vacuum glass module 11 and a third interval 10c is formed, and the third interval 10c is filled with inert gas so as to improve the heat insulation effect of the heat insulation door.

A third sealing portion S3 is disposed between an edge of the fourth glass plate 13 and an edge of the vacuum glass module 11 to enable the third interval 10b to form an enclosed space. In general, the third sealing portion S3 is also basically in an annular shape surrounding the vacuum glass module 11.

Further, in a width and/or length direction of the vacuum glass module 11, the third glass plate 12 serving as the front decoration plate is provided with a protruding portion 12a that extends out of the edge of the vacuum glass module 11, and FIG. 2 only shows the protruding portion 12a on one side. The protruding portion 12a can be used for shielding other parts, for example, can be used for partially or completely shielding the doorframe 20. In the present embodiment, along the front-to-rear direction of the door, the protruding portion 12a completely shields the doorframe 20.

Moreover, in a width and/or length direction of the first glass plate 11a, i.e. in the length or width direction of the door body 10, the protruding portion 12a of the third glass plate 12 extends out of the fourth glass plate 13. It can be seen from FIG. 2, the dimension and the shape of the fourth glass plate 13 are basically consistent with the dimension and the shape of the vacuum glass module 11 so as to completely shield the vacuum glass module 11.

As shown in FIG. 4, the doorframe 20 surrounds the vacuum glass module 11, the doorframe 20 can be divided into a side frame portion 21 and a rear frame portion 22, the side frame portion 21 is located outside a peripheral surface of the vacuum glass module 11, and the rear frame portion 22 is located at the back of the vacuum glass module 11 along the front-to-rear direction X of the door.

The doorframe 20 is internally provided with a first cooperative wall 21a located in front of the rear frame portion 22 and located at the back of the protruding portion 12a, a second cooperative wall 22a facing the back of the vacuum glass module 11, and a connecting wall 21b connecting the first cooperative wall 21a and the second cooperative wall 22a.

Specifically, the first cooperative wall 21a and the connecting wall 21b are disposed on the side frame portion 21, and the second cooperative wall 22a is disposed on the rear frame portion 22. The connecting wall 21b is located on the inner side of the side frame portion 21 and the outer side of the rear frame portion 22 and surrounds a peripheral edge of the vacuum glass module 11. Along the front-to-rear direction X, the vacuum glass module 11 and the fourth glass plate 13 are located between the first cooperative wall 21a and the second cooperative wall 22a. The protruding portion 12a is connected to the first cooperative wall 21a, and the vacuum glass module 11 may be directly or indirectly connected to the second cooperative wall 22a. In the present embodiment, the rear frame portion 22 and the fourth glass plate 13 are bonded by using glue through the second cooperative wall 22a.

The second cooperative wall 22a covers all sealing areas, i.e the first sealing portion S1, the second sealing portion S2 and the third sealing portion S3 in the door body.

Figure 5:
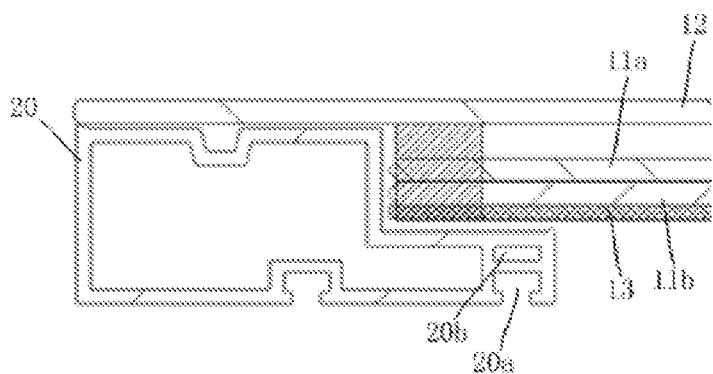
FIG. 5 is a local cross-section schematic diagram of the heat insulation door of another embodiment of the present invention.

In some other embodiments, as shown in FIG. 5, the fourth glass plate 13 may also be bonded to the vacuum glass module 11.

Further, a mounting slot 20a is also disposed at the back of the rear frame portion 22 and used for mounting the door sealing strip (not shown). The door sealing strip is arranged on the inner side of each sealing portion S1, S2 and S3. Thus, the door sealing strip 30 is located on the inner side of each sealing portion S1, S2 and S3, the door sealing strip is staggered to the sealing portions S1, S2 and S3 in the front-to-rear direction X of the door, thus the cold air can be prevented from being directly leaked via the door sealing strip and the sealing portions along the front-to-rear direction X, thereby improving the condensation problem on the front side surface of the door body.

The rear frame portion 22 is also provided with an independently enclosed heat insulation cavity 20b on the inner sides of the sealing portions S1, S2 and S3.

The heat insulation cavity 20b is used for blocking the cold air between the sealing portions S1, S2 and S3 and the refrigeration space of the refrigeration appliance, thereby preventing the cold air from being leaked from the door sealing strip.

The quantity of the heat insulation cavities 20b may be one or more, as shown in FIG. 4 and FIG. 5, any one of the heat insulation cavities 20b may be located between the door sealing strip 30 and the heat insulation glass module 11 along the front-to-rear direction X so as to block the cold air between the refrigeration space and the heat insulation glass module 11. Or in some other embodiments, the heat insulation cavities 20b may also be located on the inner side of the door sealing strip so as to block the cold air between the door sealing strip and the refrigeration space.

Although the present invention is disclosed as above, the present invention is not limited thereto. Various changes and modifications may be made by any technical skilled in the art without departing from the spirit and scope of the present invention, and the protection scope of the present invention shall be defined by the scope of the claims.

The invention claimed is:

1. A heat insulation door for a refrigeration appliance, the heat insulation door comprising:
   a heat insulation vacuum glass module having a first glass plate and a second glass plate that are overlapped and defining a first interval; and
   a third glass plate overlapped on the vacuum glass module and forming a second interval with the vacuum glass module; and
   an inert gas filled in the second interval.

2. The heat insulation door according to claim 1, wherein a first sealing portion is provided between an edge of the first glass plate and an edge of the second glass plate, to enable the first interval to form an enclosed space.

3. The heat insulation door according to claim 1, wherein a second sealing portion is provided between an edge of the third glass plate and an edge of the vacuum glass module, to enable the second interval to form enclosed space.

4. A refrigeration appliance, comprising the heat insulation door according to claim 1.

5. A heat insulation door for a refrigeration appliance, the heat insulation door comprising:
   a heat insulation vacuum glass module having a first glass plate and a second glass plate that are overlapped and defining a first interval; and
   a third glass plate overlapped on the vacuum glass module and forming a second interval with the vacuum glass module;
   an inert gas filled in the second interval; and
   a fourth glass plate being overlapped on a side of the vacuum glass module away from the third glass plate and having a third interval with the vacuum glass module, the third interval being filled with inert gas.

6. The heat insulation door according to claim 5, wherein a third sealing portion is provided between an edge of the fourth glass plate and an edge of the vacuum glass module, to enable the third interval to form enclosed space.

7. The heat insulation door according to claim 5, wherein:
   along a front-to-rear direction of the door, one of the third glass plate and the fourth glass plate is located in front of the vacuum glass module as a front decoration plate, and the other of the third glass plate and the fourth glass plate is located at the back of the vacuum glass module as a rear protective layer; and
   in at least one of a width or length direction of the first glass plate, the front decoration plate has a protruding portion that extends out of an edge of the vacuum glass module.

8. The heat insulation door according to claim 7, wherein the protruding portion of the front decoration plate extends out of the rear protective layer in at least one of the width or length direction of the first glass plate.

9. The heat insulation door according to claim 7, wherein the heat insulation door further comprises a doorframe surrounding the vacuum glass module, and the doorframe comprises:
   a first cooperative wall, located on a rear side of the protruding portion and connected to the protruding portion;

a second cooperative wall, located behind the first cooperative wall along the front-to-rear direction; and a connecting wall, connecting the first cooperative wall and the second cooperative wall, and wherein the vacuum glass module is located between the first cooperative wall and the second cooperative wall along the front-to-rear direction.

10. The heat insulation door according to claim 9, wherein a rear surface of the rear protective layer and the second cooperative wall are face-to-face and connected to each other.

11. The heat insulation door according to claim 9, wherein the protruding portion completely shields the doorframe along the front-to-rear direction of the door.

12. The heat insulation door according to claim 9, wherein a sealing portion is provided at edges of two adjacent layer structures having an interval in a multi-layer structure formed by the front decoration plate, the first glass plate, the second glass plate, and the rear protective layer, and projections of sealing portions to the front-to-rear direction of the door are overlapped with each other.

13. The heat insulation door according to claim 12, wherein the second cooperative wall covers the sealing portion.

14. The heat insulation door according to claim 7, wherein the front decoration plate is a colorful crystal glass plate.

15. The heat insulation door according to claim 7, wherein the rear protective layer is a toughened glass plate, a vacuum glass plate, or a plastic plate.

* * * * *